United States Patent [19]
Staiger

[11] Patent Number: 6,142,717
[45] Date of Patent: Nov. 7, 2000

[54] METHOD AND APPARATUS FOR RE-KEYING A LOCK

[76] Inventor: William A. Staiger, 164 W. 100 South, Provo, Utah 84601

[21] Appl. No.: 09/313,921

[22] Filed: May 18, 1999

[51] Int. Cl.[7] .............................. B23B 41/00; B23B 49/02
[52] U.S. Cl. ...................................... 408/115 R; 408/104
[58] Field of Search .................................. 408/72 B, 97, 408/103, 104, 115 R, 115 B, 241 B

[56] References Cited

U.S. PATENT DOCUMENTS

| | | | |
|---|---|---|---|
| 2,353,757 | 7/1944 | Priest, Jr. ............................. | 408/115 R |
| 2,453,482 | 11/1948 | Woolson ............................. | 408/115 R |
| 4,005,945 | 2/1977 | Gutman . | |
| 4,461,603 | 7/1984 | Klee et al. . | |
| 4,712,950 | 12/1987 | Reynolds ............................. | 408/115 R |
| 5,211,044 | 5/1993 | Kim . | |
| 5,682,779 | 11/1997 | Dolev . | |
| 5,688,085 | 11/1997 | Watts . | |
| 5,752,400 | 5/1998 | Kim . | |

*Primary Examiner*—Daniel W. Howell
*Attorney, Agent, or Firm*—Schmeiser, Olsen & Watts; Albert L. Schmeiser

[57] ABSTRACT

A re-keying process includes inserting a peg (65) into a plug (10) of a cylinder lock to be re-keyed. The peg (65) partially blocks a key slot (18) in the plug (10), thereby preventing the original key (30) to be inserted into the plug (10). A longitudinal groove (75) is then formed on the blade (74) of a key (70), thereby allowing the key (70) to be inserted into the partially blocked key slot (18). To insert the peg (65) into the plug (10), the plug (10) is placed in a bore (45) of a drill block (40). An alignment bolt (61) is used to positioning the plug (10) in the bore (45). A drill bit (62) is inserted into a drill guide hole (52) in the drill block (40) to drill a hole (63) in the plug (10). The peg (65) is then screwed into the hole (63).

7 Claims, 6 Drawing Sheets

METHOD AND APPARATUS FOR RE-KEYING A LOCK

FIELD OF THE INVENTION

The present invention relates, in general, to locks and, more particularly, to the re-keying of cylinder locks.

BACKGROUND OF THE INVENTION

Key operated cylinder locks are widely used in various aspects of everyday life. It is often desirable to be able to change a lock. A typical changeable cylinder lock includes an alterable combination of tumbler pins that matches the combination of teeth on a proper key for opening the lock. The lock is changed or re-keyed by altering the combination of the tumbler pins and teething the key accordingly. The keys for opening the lock before and after the re-keying have different teeth, but generally have the same longitudinal groove patterns on their blades. Therefore, the key for opening the lock before the re-keying can also be inserted in the key slot after the re-keying. Further, the keys for opening the lock before and after the re-keying can be formed from the same kind of key blanks, which are usually available in many hardware and locksmith stores. Because of security considerations, the identical groove patterns for keys before and after the re-keying and wide availability of the key blanks for the re-keyed lock are sometimes undesirable.

Accordingly, it would be advantageous to have a method for re-keying a lock that is simple and cost efficient. It is desirable if the key for the lock before the re-keying cannot be inserted into the lock after the re-keying. It is also desirable for the key for the re-keyed lock to have a unique feature that is not readily available on the market. It would be of further advantage to have a simple, reliable, and cost efficient apparatus to implement the re-keying method.

SUMMARY OF THE INVENTION

A prime object of the present invention is to provide a simple, effective, and cost efficient process for re-keying locks. Another object is to provide a simple and reliable apparatus for implementing the re-keying process. A further object of the present invention is to provide the re-keying process wherein the key for the lock before the re-keying cannot be inserted into the re-keyed lock. In addition, it is an object of the present invention to provide the re-keying process wherein the key for the re-keyed lock has a unique feature not present on the key blanks readily available on the market.

In order to achieve these and other objects of the present invention, a re-keying process includes inserting a peg into the plug of a cylinder lock to be re-keyed. The peg penetrates a side of the key slot in the plug and intrudes into the key slot, thereby partially blocking the key slot and preventing the original key to be inserted into the key slot. A longitudinal groove is then formed on the blade of the key. The groove on the key blade allows the key to be inserted into the partially blocked key slot in the plug. If further change is desired, the tumbler pin combination can be altered and the key is teethed to match the new tumbler pin combination. Alternatively, a longitudinal groove can be formed on a key blank and the key blank is teethed to fit the tumbler pin combination of the re-keyed plug.

An apparatus for re-keying the lock as described above includes a drill block and an alignment bolt. The drill block has a longitudinal bore for receiving the plug. The drill block also has a radial alignment hole and a radial drill guide communicating with the bore. To re-key the lock, the plug of the lock is placed in the bore. The alignment bolt is used to align a tumbler pin hole in the plug with the alignment hole. Preferably, the drill guide is substantially perpendicular to the side of the key slot when the tumbler pin hole is aligned to the alignment hole in the drill block. A drill bit is inserted into the drill guide in the drill block to drill a hole on the side of the plug. The hole, which extends from the sidewall of the plug to the key slot, is tapped. A set screw with a pointed end serves as the peg and is screwed into the tapped hole until the pointed end of the screw partially blocks the key slot. In a preferred embodiment, the drill block also includes a tap guide located on a cantilever edge of the drill block. The tap guide is substantially parallel to the drill guide. After drilling the hole in the side of the plug, the plug is repositioned in the bore to align the hole on the plug with the tap guide. This is conveniently achievable by aligning another tumbler pin hole on plug to the alignment hole in the drill block. Then, the hole is tapped through the tap guide in the drill block.

DETAILED DESCRIPTION OF THE PREFERRED EMBODIMENTS

Various embodiments of the present invention are described herein below with reference to the figures. It should be noted that the figures are not necessarily drawn to scale and that elements having similar functions are labeled using the same reference numerals in the figures.

Figure 1:
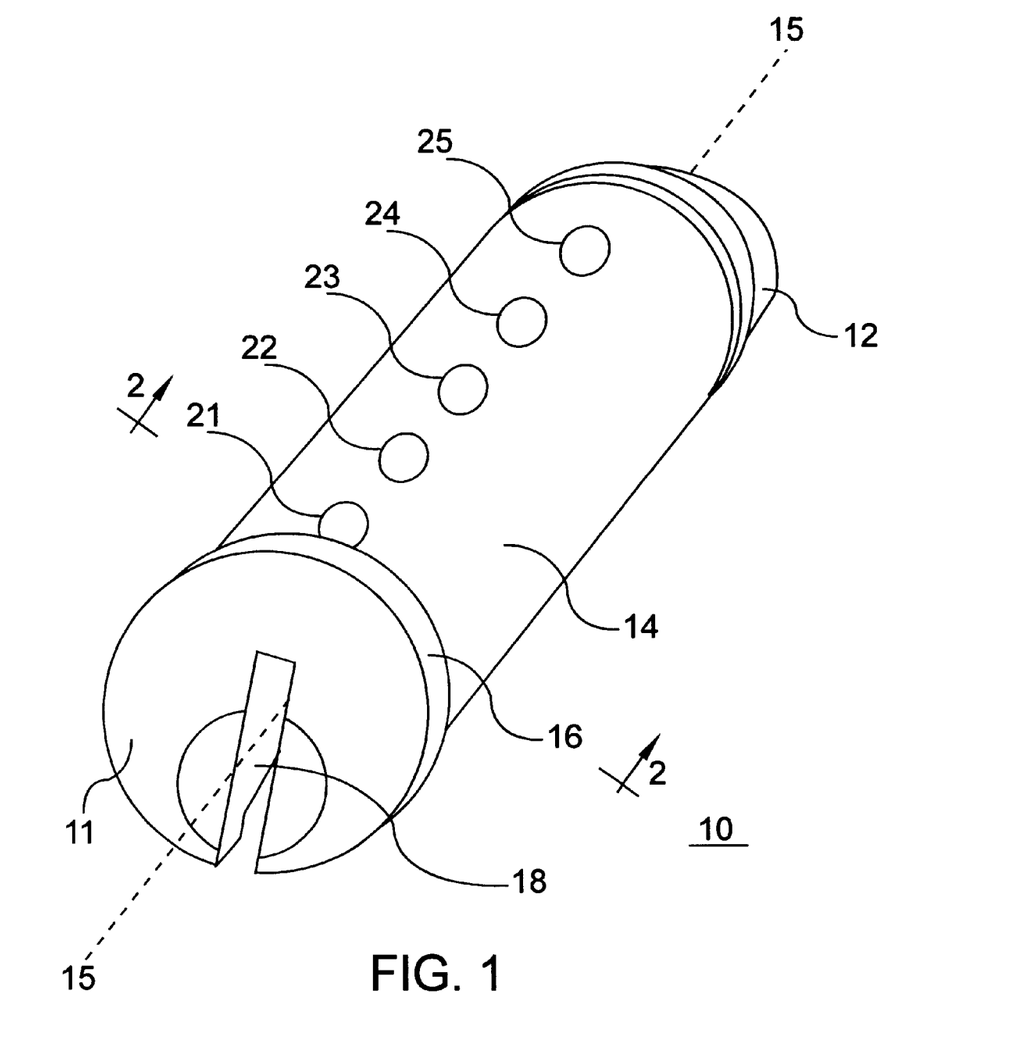
FIG. 1 is an isometric view of a cylinder lock plug before a re-keying process in accordance with the present invention.
Figure 2:
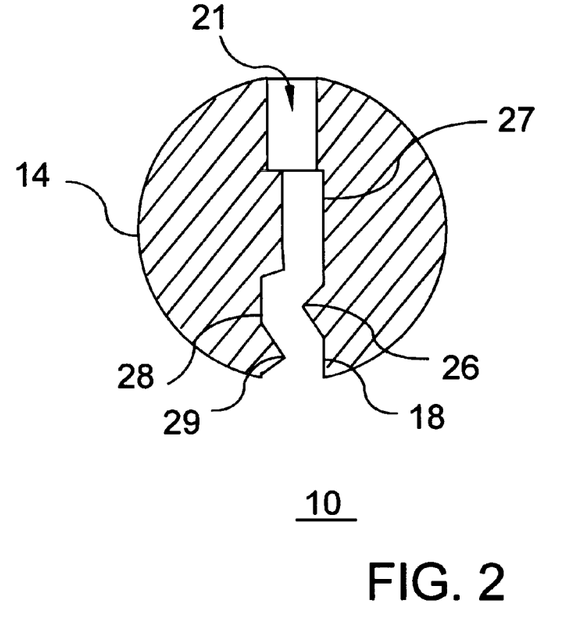
FIG. 2 is a cross sectional view of the lock plug along a cross section 2—2 shown in FIG. 1.

FIGS. 1 and 2 illustrate a cylinder lock plug 10 before a re-keying process in accordance with the present invention. More particularly, FIG. 1 is an isometric view of lock plug 10 and FIG. 2 is a cross sectional view of lock plug 10 along a cross section 2—2 shown in FIG. 1. Lock plug 10 can be any kind of key operated cylinder lock plug. Lock plug 10 has a front face or a front end 11, a back end 12, and a side or a body 14 therebetween. Lock plug 10 is of a cylindrical shape and has a rotational axis 15. Front end 11 has a flange 16. Thus, the diameter of front end 11 is greater than that of body 14. Lock plug 10 also has a key slot 18 extending from front end 11 into body 14. Preferably, key slot 18 passes through rotational axis 15. A plurality of tumbler pin holes are formed in body 14 and substantially perpendicular to rotational axis 15. FIG. 1 shows five tumbler pin holes 21, 22, 23, 24, and 25, which are substantially coplanar with key slot 18 and communicate with key slot 18. Inside key slot 18, there are a ridge 26 (shown in FIG. 2) on a first sidewall 27 (shown in FIG. 2), a notch 28 and a ridge 29 (shown in FIG. 2) on a second sidewall opposite to sidewall 27.

Figure 3:
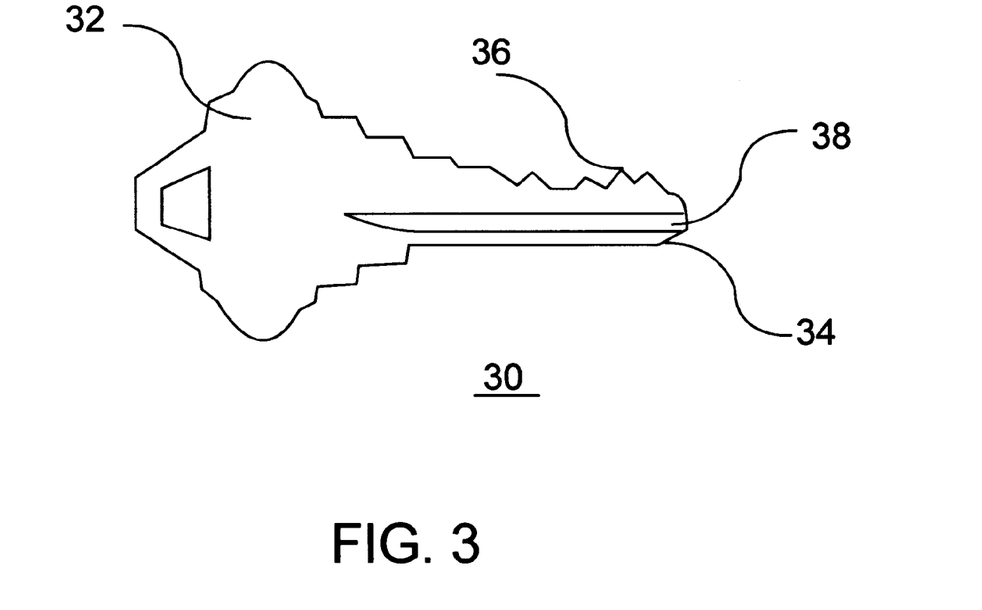
FIG. 3 illustrates a key for the lock plug of FIG. 1.

FIG. 3 illustrates a key 30 for lock plug 10 shown in FIGS. 1 and 2. Key 30 has a handle or a bow 32 and a blade 34. Teeth 36 are formed on the top portion of blade 34. On the sides of blade 34, there are grooves and protrusions that mate with the ridges and notches in key slot 18 of lock plug 10 (shown in FIGS. 1 and 2), thereby allowing key 30 to be inserted into key slot 18. It should be noted that FIG. 3 only shows a groove 38 on one side of blade 34 of key 30, and there are additional grooves and/or protrusions on the other side of blade 34.

In operation, lock plug 10 is placed in a lock cylinder (not shown) that has pin holes matching tumbler pin holes 21, 22, 23, 24, and 25 on lock plug 10. A combination of tumbler pins (not shown) are disposed in the pin holes in the lock cylinder and tumbler pin holes 21, 22, 23, 24, and 25 on lock plug 10. When key 30 is inserted into key slot 18, teeth 36 on blade 34 of key 30 lift the tumbler pins in tumbler pin holes 21, 22, 23, 24, and 25. If teeth 36 and the tumbler pins match each other, lock plug 10 can be rotated in the cylinder by turning key 30, thereby opening the lock. Otherwise, the tumbler pins prevent the rotational motion of lock plug 10 with respect to the cylinder. The operation of a cylinder lock as described herein is well known in the art. A conventional process for re-keying a cylinder lock includes changing the combination of the tumbler pins and teething a key blank accordingly. The key blank should have grooves and/or protrusions, e.g., groove 38 shown in FIG. 3, matching the ridges and/or notches in key slot 18 shown in FIG. 2.

If lock plug 10 is manufactured by a commercial lock manufacturer, key blanks having grooves and/or protrusions matching the ridges and/or notches in key slot 18 are usually readily available in hardware and locksmith stores. An unauthorized key for opening the lock can be potentially made relatively easily, thereby jeopardizing the security for the users of the lock. The present invention provides a re-keying process so that the key blanks for the re-keyed lock are not readily available. Therefore, a key re-keyed in accordance with the present invention provides a higher degree of security.

Figure 4:
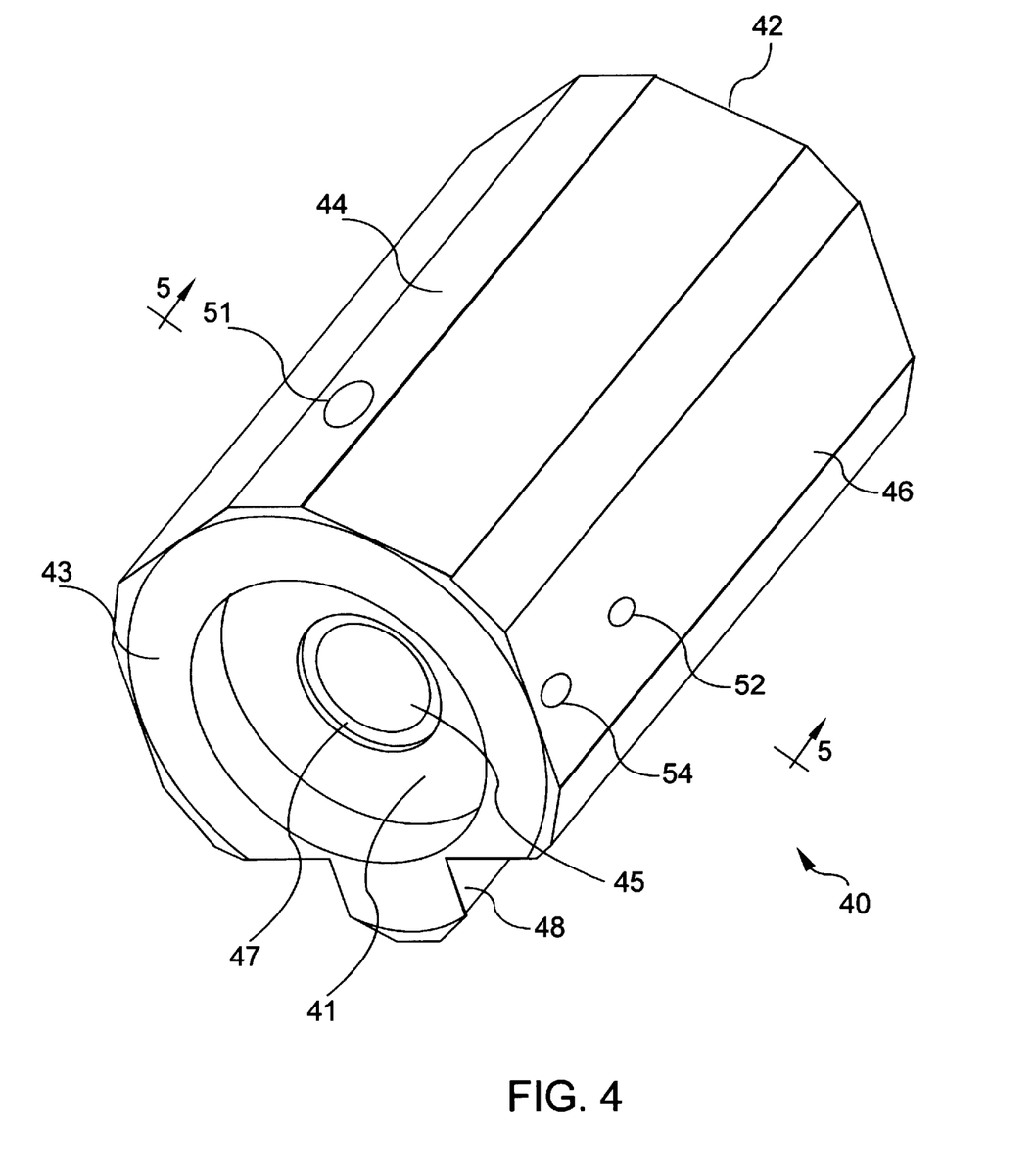
FIG. 4 is an isometric view of a drill block for re-keying a lock in accordance with the present invention.

FIG. 4 is an isometric view of a drill block 40 for re-keying a lock in accordance with the present invention. Drill block 40 is preferably made of a hard material. Suitable materials for drill block 40 include steel, aluminum, iron, brass, plastic, etc. Drill block 40 has a front end 41, a back end 42, and a plurality of sidewalls therebetween. A narrow sidewall 44 and a broad sidewall 46 are shown in FIG. 4 as two representative sidewalls of drill block 40. A narrow sidewall is also referred to as a ridge of drill block 40. The sidewalls extend beyond front end 41, forming a cantilever edge 43 surrounding front end 41. A bore 45 is formed in drill block 40 extending front end 41 to back end 42. A recessed area or a depression 47 is formed in front end 41 surrounding bore 45. Preferably, depression 47 is concentric with bore 45. Bore 45 and depression 47 are designed for receiving body 14 and flange 16, respectively, of lock plug 10 shown in FIG. 1. By way of example, bore 45 has a diameter between approximately 12 millimeters (mm) and approximately 16 mm, depression 47 has a diameter between approximately 14 mm and approximately 18 mm and a depth between approximately 1 mm and approximately 3 mm. Drill block 40 also has a tab or a vise holder 48 on one of the sidewalls so that drill block 40 can be securely held in a vise (not shown).

Various holes are formed on the sidewalls of drill block 40. As shown in FIG. 4, an alignment hole 51 is formed on ridge 44, a drill guide hole 52 is formed on sidewall 46, and a tap guide hole 54 is formed on sidewall 46 on cantilever edge 43. Alignment hole 51, drill guide hole 52, tap guide hole 54 extend from the sidewalls of drill block 40 to the side of bore 45. In other words, alignment hole 51, drill guide hole 52, and tap guide hole 54 communicate with bore 45. Drill guide hole 52 and tap guide hole 54 are substantial parallel to each other, and they are substantially perpendicular to alignment hole 51. Preferably, guide hole 52, tap guide hole 54, and bore 45 are substantially coplanar with each other, and alignment hole 51 and bore 45 are coplanar with each other. Furthermore, the central axes of bore 45, drill guide hole 52, and tap guide hole 54 lie in a geometric plane that is substantially perpendicular to a geometric plane formed by the central axes of bore 45 and alignment holes 51.

Figure 5:
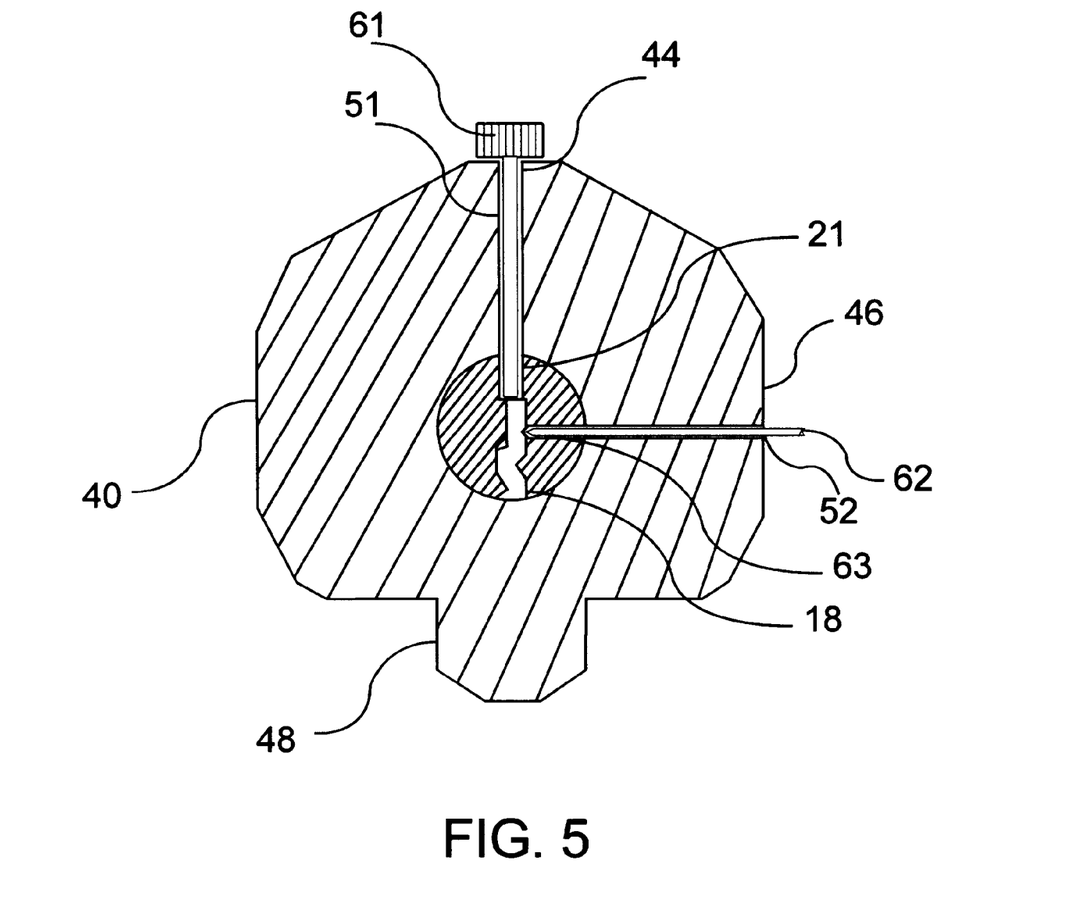
FIG. 5 is a cross sectional view of the drill block along a cross section 5—5 shown in FIG. 4.

The process of re-keying a lock starts with dissembling the lock to remove lock plug 10 (shown in FIGS. 1 and 2) from the lock cylinder (not shown). Lock plug 10 is then inserted in bore 45 of drill block 40 as shown in FIG. 5, which is a cross sectional view of drill block 40. Flange 16 (shown in FIG. 1) of lock plug 10 fits into depression 47 (shown in FIG. 4) on front end 41 of drill block 40. Lock plug 10 is positioned in bore 45 to align tumbler pin hole 21 to alignment hole 51. An alignment bolt 61 is inserted into alignment hole 51. Alignment bolt 61 preferably has a pointed tip extending into tumbler pin hole 21, thereby securing lock plug 10 in bore 45. In a preferred embodiment, alignment hole 51 is threaded and alignment bolt 61 is screwed into alignment hole 61 to hold lock plug 10 in place. Typically, hand tightening alignment bolt 61 in alignment hole 51 is sufficient. Drill block 40 is placed in a vise (not shown). A drill bit 62 mounted on a power drill (not shown) is inserted into drill guide hole 52 to drill a hole 63 in body 14 of lock plug 10. Hole 63 communicates with key slot 18. Preferably, hole 63 is adjacent front end 11 of lock plug 10. In a preferred embodiment, the drilling continues until drill bit 62 penetrates side 27, passes through key slot 18, and drills into the opposite side of key slot 18 to a depth of approximately 1.5 mm.

After forming hole 63 in body 14 of lock plug 10, alignment bolt 61 is turned loose and lock plug 10 is repositioned in bore 45 to align hole 63 with tap guide hole 54 on cantilever edge 43 of drill block 40. Preferably, the distance between drill guide hole 52 and tap guide hole 54 is substantially equal to that between selected to tumbler pin holes, e.g., tumbler pin holes 21 and 23 (shown in FIG. 1), on lock plug 10. Therefore, when tumbler pin hole 23 on lock plug 10 is aligned to alignment hole 51, hole 63 is aligned to tap guide hole 54. Alignment bolt 61 is screwed into alignment hole 51 to hold lock plug 10 in place. A tap attached to a wrench (not shown) is inserted into hole 63 through tap guide hole 54 in drill block 40 and cuts screw threads in hole 63. In other words, the tap is used to tap hole 63 in lock plug 10.

Figure 6:
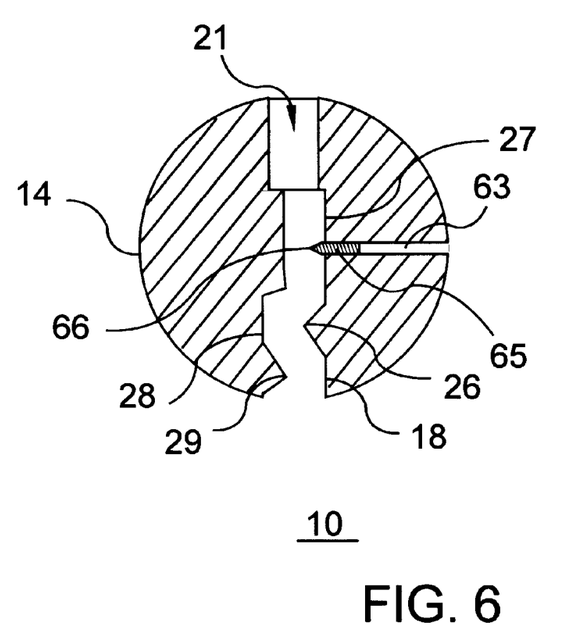
FIG. 6 is a cross sectional view of the lock plug along the cross section shown in FIG. 2 at a subsequent step of the re-keying process.

Referring now to FIG. 6, which is a cross sectional view of lock plug 10 along the same cross section as that shown in FIG. 2. A threaded peg 65 having a cone shaped end or a pointed tip 66 is screwed into hole 63. Threaded peg 65 is also referred to as a set screw or simply a screw. Pointed tip 66 extends into key slot 18, thereby partially blocking key slot 18. This step of inserting peg 65 into hole 63 can be performed either with lock plug 10 in bore 45 and hole 63 aligned with tap guide hole 54 or with lock plug 10 removed from drill block 40.

In a preferred embodiment, a grooved key blank (not shown) is inserted into key slot 18. The blade of the grooved key blank has a cross section similar to that of blade 34 of key 30 shown in FIG. 3. However, the grooved key blank has a longitudinal groove on its blade that is aligned with hole 63 when the grooved key blank is inserted into key slot 18. By way of example, the depth of the groove is between approximately 1 mm and approximately 3 mm. Peg 65 is screwed into hole 63 until tip 66 is tightly pressed against the groove in the grooved key blank so that the grooved key blank is stuck in key slot 18. Peg 65 is then loosened a little, e.g., approximately one half turn, to allow the grooved key blank to be pull out of key slot 18. Preferably, a drop of a sealant such as, for example, a commercially available sealant sold under the trademark LOCKTITE is applied to the thread in hole 63 or to peg 65 before inserting peg 65 into hole 63. When the sealant dries, it secures peg 65 in hole 63.

Lock plug 10 is now ready to be placed back into the lock cylinder (not shown). When assembling lock plug 10 with the lock cylinder, the combination of the tumbler pins (not shown) in tumbler pin holes 21, 22, 23, 24, and 25 (shown in FIG. 1) can be either the same as or different from the tumbler pin combination before the re-keying process.

Figure 7:
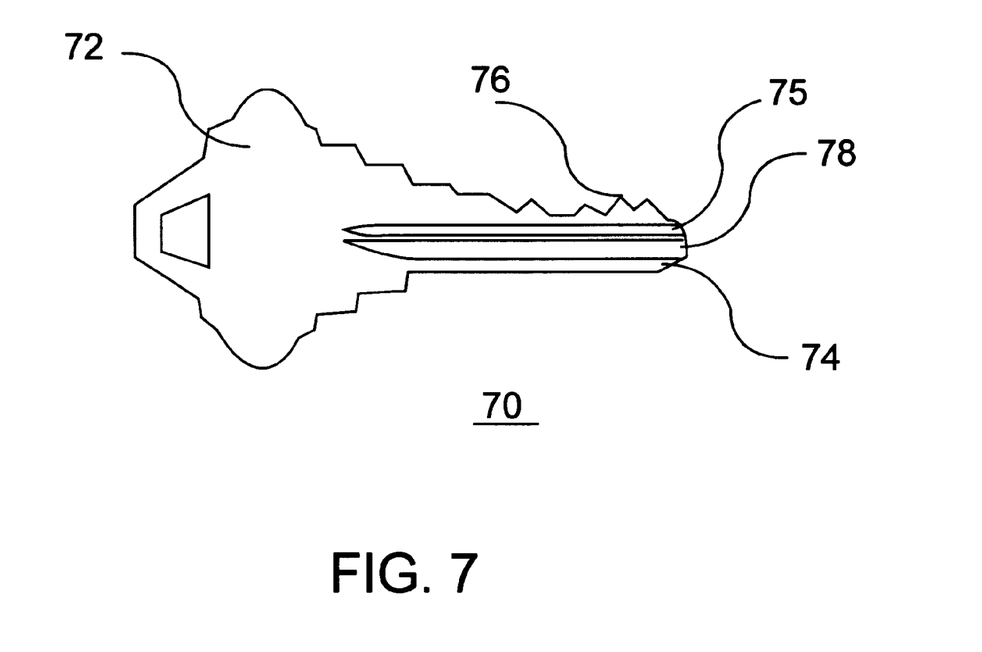
FIG. 7 illustrates a key for the lock plug of FIG. 6 after the re-keying process.

After the re-keying process, key 30 (shown in FIG. 3) can no longer be inserted into key slot 18 because peg 65 partially blocks key slot 18. FIG. 7 shows a key 70 for opening the lock after the re-keying process. Key 70 has a handle or a bow 72 and a blade 72. The cross section of blade 74 is similar to that of blade 34 of key 30 shown in FIG. 3. For example, blade 74 has a groove 78 corresponding to groove 38 in key 30. Teeth 76 can be the same as or different from teeth 36 in key 30 depending on the tumbler pin combination of the lock after the re-keying process. A difference between key 70 and key 30 is that there is an addition longitudinal groove 75 formed on blade 74 of key 70. Groove 75 is aligned with tip 66 of peg 65 in key slot 18, thereby allowing key 70 to be inserted into key slot 18. If the re-keying process does not change the tumbler pin combination, key 70 can be simply formed from key 30 by milling groove 75 on blade 34. If the re-keying process changes the tumbler pin combination, key 70 is formed using a key blank that has the same cross section as key 30. Groove 75 is milled into the blade of the key blank, thereby allowing the key blank to be inserted into key slot 18. Then, the key blank is teethed to match the tumbler pin combination of the lock.

It should be understood that the structure of drill block 40 for re-keying a lock is not limited to that described herein above. For example, drill block 40 can have different alignment holes, drill guide holes, and tap guide holes from those shown in FIG. 4. Preferably, the sizes and locations of various holes will enable drill block 40 to be used for re-keying locks of different features, e.g., the numbers, sizes, and locations of tumbler pin holes. Alignment hole 51 in drill block 40 is not limited to being aligned with tumbler pin holes 21 and 23 when forming and tapping, respectively, hole 63 in lock plug 10. Depending on its location on drill block 40, alignment hole 51 can be aligned with other holes, e.g., tumbler pin holes 22, 24, and 25, in lock plug 10 during the re-keying process. For example, in an alternative embodiment, alignment hole 51 is aligned with tumbler pin hole 22 while drilling hole 63 and aligned with tumbler pin hole 24 while tapping hole 63. In addition, bore 45 in drill block 40 can extend to back end 42 of drill block 40 or partially into the body of drill block 40. Back end 42 of drill block can also have a cantilever edge like cantilever edge 43 at front end 41 of drill block 40. The diameter of bore 45 adjacent front end 41 can be different from the diameter of bore 45 adjacent back end 42, so that drill block 40 can be used for re-keying lock plugs of different diameters. Furthermore, vise holder 48 is an optional feature of drill block 40.

Figure 8:
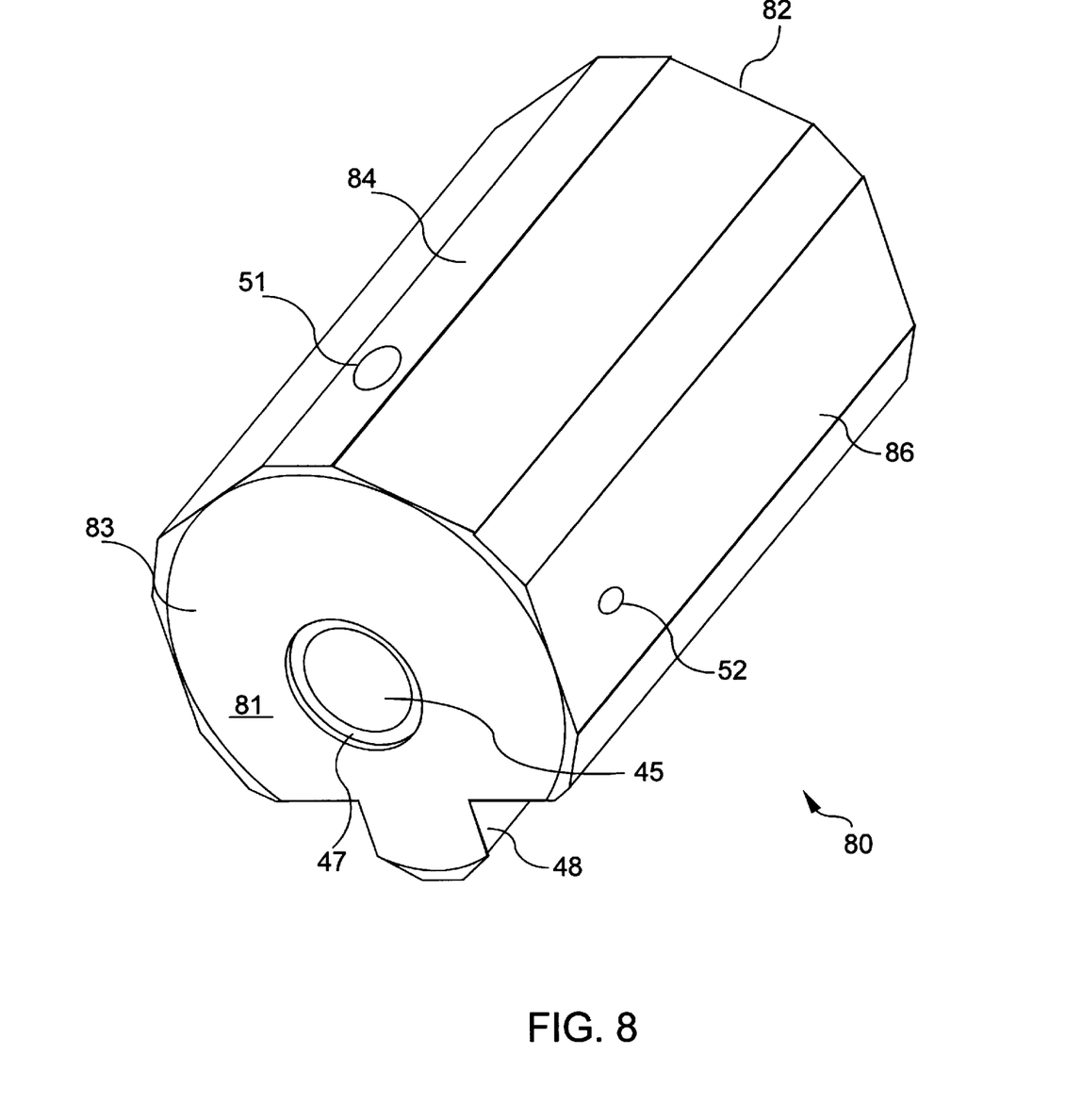
FIG. 8 is an isometric view of a drill block used in a re-keying process in accordance with an alternative embodiment of the present invention.

FIG. 8 is an isometric view of a drill block 80 used in a re-keying process in accordance with an alternative embodiment of the present invention. Like drill block 40 shown in FIG. 4, drill block 80 is preferably made of a hard material such as, for example, steel, aluminum, iron, brass, plastic, etc. Drill block 80 has a front end 81, a back end 82, and a plurality of sidewalls therebetween. A narrow sidewall 84 and a broad sidewall 86 are shown in FIG. 8 as two representative sidewalls of drill block 80. A narrow sidewall is also referred to as a ridge of drill block 40. A bore 45 is formed in drill block 80 extending front end 81 to back end 82. A recessed area or a depression 47 is formed in front end 81 surrounding bore 45. Bore 45 and depression 47 are designed for receiving body 14 and flange 16, respectively, of lock plug 10 shown in FIG. 1. Drill block 80 also has a tab or a vise holder 48 so that drill block 80 can be securely held in a vise. Various holes are formed on the sidewalls of drill block 80. As shown in FIG. 8, an alignment hole 51 is formed on ridge 84, and a drill guide hole 52 is formed on sidewall 86. Alignment hole 51 and drill guide hole 52 communicate with bore 45. The central axes of bore 45 and drill guide hole 52 lie in a geometric plane that is substantially perpendicular to a geometric plane formed by the central axes of bore 45 and alignment holes 51.

A difference between drill block 40 shown in FIG. 4 and drill block 80 is that the sidewalls in drill block 80 do not extend beyond front end 81. Therefore, drill block 80 does not have a cantilever edge like cantilever edge 43 in drill block 40. Further, tap guide hole 54 in drill block 40 is absent in drill block 80.

The process of re-keying a lock using drill block 80 is similar to that using drill block 40 of FIG. 4. It starts with dissembling the lock to remove lock plug 10 (shown in FIGS. 1 and 2) from the lock cylinder (not shown). Lock plug 10 is then inserted in bore 45 of drill block 80. Lock plug 10 is positioned in bore 45 to align tumbler pin 21 to alignment hole 51. An alignment bolt (not shown) is inserted into alignment hole 51, thereby securing lock plug 10 in bore 45. A drill bit mounted on a power drill (not shown) is inserted into drill guide hole 52 to drill hole 63 in body 14 of lock plug 10 (shown in FIG. 6).

After forming hole 63, lock plug 10 is removed from drill block 80. A tap wrench (not shown) cuts screw threads in hole 63. Threaded peg 65 having a pointed tip 66 is screwed into hole 63. Pointed tip 66 extends into key slot 18, thereby partially blocking key slot 18 (shown in FIG. 6). Preferably, a drop of a sealant such as, for example, a commercially available sealant sold under the trademark LOCKTITE is applied to the thread in hole 63 or to peg 65 before inserting peg 65 into hole 63. When the sealant dries, it secures peg 65 in hole 63.

By now it should be appreciated that a method and an apparatus for re-keying a lock have been provided. The re-keying process of the present invention includes inserting a peg into the lock plug of a cylinder lock to be re-keyed. The peg intrudes into the key slot of the lock plug, thereby partially blocking the key slot and preventing the original key to be inserted into the key slot. The new key for the re-keyed lock includes a longitudinal groove on its blade. The groove is aligned to the peg partially blocking the key slot and allows the key to be inserted into the lock plug. Because the peg partially blocks the key slot, the original key can no longer be inserted into the lock after the re-keying process of the present invention. In addition, the key for the re-keyed lock has a unique groove that is not readily available on the market. Therefore, the re-keying process of the present invention provides a higher degree of security. An apparatus for implementing the re-keying process of the present invention includes a drill block having a bore for receiving the lock plug to be re-keyed. A alignment bolt is used to align the lock plug in the bore so that a hole substantially perpendicular to the key slot in the lock plug is drilled into the lock plug through a drill guide hole in the drill block. A peg is subsequently inserted in the hole to partially block the key slot. The apparatus is easy to make and durable. The re-keying process is simple, time efficient, and cost efficient.

What is claimed is:

1. A re-keying apparatus, comprising:

a drill block having first end, a second end, a plurality of sidewalls coupled between the first end and the second end, said drill block having a bore extending from the first end and adapted for receiving a lock plug, said drill block also having an alignment hole and a drill guide hole in a first sidewall and a second sidewall, respectively, of the plurality of sidewalls and communicating with the bore; and an alignment bolt removably inserted in the alignment hole, said alignment bolt aligning one of a plurality of pin holes in the lock plug with the alignment hole.

2. The re-keying apparatus of claim 1, wherein the alignment hole and the drill guide hole in said drill block are substantially perpendicular to each other.

3. The re-keying apparatus of claim 1, wherein the first end of said drill block has a depression surrounding the bore and adapted for receiving a flange of the lock plug when the lock plug is placed in the bore of said drill block.

4. The re-keying apparatus of claim 1, wherein:

said drill block has a cantilever edge around the first end; and the cantilever edge has a tap guide hole thereon substantially parallel to the drill guide hole.

5. The re-keying apparatus of claim 4, wherein the drill guide hole, the tap guide hole, and a central axis of the bore in the drill block lie in a first geometric plane.

6. The re-keying apparatus of claim 5, wherein the alignment hole and the central axis of the bore in the drill block lie in a second geometric plane substantially perpendicular to the first geometric plane.

7. The re-keying apparatus of claim 1, wherein said drill block has vise holder on a third sidewall of the plurality of sidewalls.

* * * * *